INVENTORS:
Joseph B. Clay
and Clarence E. Jetson,
BY Bair, Freeman & Molinare
ATTORNEYS.

Nov. 17, 1964  J. B. CLAY ETAL  3,157,157

METHOD AND APPARATUS FOR DISPENSING FEED TO LIVESTOCK

Filed Nov. 20, 1961  7 Sheets-Sheet 3

Fig. 6
Fig. 6A
Fig. 7

INVENTORS:
Joseph B. Clay
and Clarence E. T. Letson, BY Bair, Freeman & Molinare
ATTORNEYS.

3,157,157
METHOD AND APPARATUS FOR DISPENSING FEED TO LIVESTOCK

Joseph B. Clay and Clarence E. T. Letson, Cedar Falls, Iowa, assignors to Clay Equipment Corporation, Cedar Falls, Iowa, a corporation of Iowa
Filed Nov. 20, 1961, Ser. No. 153,305
19 Claims. (Cl. 119—51.11)

This invention relates to the feeding of cows during the milking period, and more particularly relates to an improved means and method of feeding cows which, by reason of the nature of the feeding process, will be referred to as dribble metered feeding.

In order to precisely understand the improvements embodied in our invention, it is necessary to review certain developments that have taken place in the past years in the handling of dairy cows. It has long been known that it is desirable to give a cow a feed ration sometime during the period in which the cow is milked. With the advent of milking parlors, it was standard procedure to provide a feed box at the head end of the cow's stall and to deliver a bulk of feed ration to the cow sometime during the milking period, and preferably at the beginning of the milking period. The delivery of the feed ration could be in any manual or mechanical manner, but the tendency and desirability of mechanizing all operations in the milking parlor has practically required systems heretofore to employ some type of mechanical apparatus for delivering a bulk of feed to the cow at about the beginning of the milking period.

Now, some years ago it was determined that it was beneficial to dairy cows to be fed enriched rations which are known as dairy concentrates. These dairy concentrates are relatively expensive as compared with forage, and, therefore, the cost of dairy concentrates constitutes an important cost factor in the efficient and economic exploitation of a dairy cow operation. For many years ground dairy concentrates had been fed to cows on a volume measurement basis. It was then shown by E. C. Schneider in a report entitled "Concentrate Metering for Dairy Cows in Stanchions and Milking Parlors," from the Agricultural Experiment Station, University of Vermont and State Agricultural College, Burlington, Vermont, Bulletin 609, September 1958, that for greatest economy and efficiency, the metering of concentrates fed to dairy cows should be based on weight measurements rather than volume. Furthermore, concentrates fed in excess of the recommended amount for a particular cow produce no appreciable income in the form of milk, and if less than the recommended amount of concentrate is fed, the cow becomes less efficient and will produce less milk than she could. It was demonstrated that if there is only a 10% error on the highside in the dispensing of 10 pounds of concentrate to each cow per day, and if this is done 305 days per year with a herd of 60 cows, the total overage of concentrate would be approximately 9 tons, and at $75.00 per ton this would represent a loss to the farmer of $675 per year. On the other hand, assuming a 10% error on the low side in dispensing of the concentrate to cows, and assuming an average production of 2 pounds of milk per pound of concentrate, each cow would give 2 pounds less milk per day, and if this were done for 305 days with 60 cows, and at a milk value of $5 per hundred weight, this represented a loss of $1830 in milk value, but a saving of $675 in concentrate, or a net income loss to the farmer of $1155. Thus, there is loss both from overfeeding and underfeeding and these losses do not average out or cancel each other.

In addition to losses by underfeeding or overfeeding, there are losses in milk production caused by disturbance of cows during the milking period. It has, of course, been known for a long time that only a contented, happy, and undisturbed cow will let its maximum milk production during the milking period. The factors which go into keeping a cow contented, happy and undisturbed include providing the cow with sufficient feed, keeping the cow's attention occupied with things that the cow thinks are good, and preventing disturbance of the cow during the milking period.

Now, with the advent of herringbone milking systems which originated in New Zealand in about 1955, there has been provided a system of arranging cows in a milking parlor which appears to increase the efficiency of space utilization and which also efficiently arranges the cows for use with automatic milking systems. However, the immediate adjacency of the cows to each other in the herringbone system results in a number of problems in avoiding disturbance of cows during the milking period. Noting that some cows are relatively fast eaters while others are relatively slow eaters, if a fast eater has consumed its feed ration in the first few minutes while in its stall, the cow, since it is closely adjacent a second cow, may seek to take feed from the second's feed box and cause disturbance which may not only affect the second cow but all other cows in the herringbone arrangement. When this occurs, milk production from the group of cows being milked falls off. If a greater feed ration is supplied to the one cow to keep its attention occupied, this may be uneconomical, since the cow may then be overfed. Again, even the greater feed ratio may be rapidly consumed, and the cow whose attention is not attracted by feed in its feed box may cause a disturbance.

The herringbone stalls pose a further problem in that with the cows parked at an angle relative to the alley or lane in which the milking attendant stands, the feed boxes are remote from the alley so that the feeding of additional rations should preferably be remotely controlled, so that a single operator may handle the entire operation.

As a final requirement, different cows require and should receive different amounts of feed concentrates. A high milk producer may require as much as 10 pounds of concentrate at a milking, while a low milk producer may only need 2 pounds of concentrate at a milking. Obviously, such a great range of feed requirements necessitates a feeding system that has considerable flexibility, since there is no way of knowing which stall a particular cow will end up in for the milking operation, and therefore each stall's feed delivery system must be capable of delivering accurate quantities of feed during a fixed period of time and within the range of 2 to 20 pounds of feed concentrate per cow. While others have heretofore proposed feeding larger rations to high milk producers, if the high producer lets its milk fast and is also a fast eater, the high producing cow may still be unoccupied during a portion of the period in the herringbone stall and may still cause a disturbance which affects the other cows in the herringbone arrangement.

Thus, one of the objects of this invention is to provide a cow feeding system which obviates all the aforesaid problems and which keeps a cow contented, happy and occupied during the entire period that the cow is in position for milking.

Another object of this invention is to provide a cow feeding system which can be readily varied remotely so as to deliver the proper selected amount of feed concentrates in varying amounts to selected cows.

A further object of this invention is to provide a feed dispensing system for cows which system is flexible enough to be readily selectively varied to deliver between 2 to 20 pounds of feed concentrate during a milking period to selected cows.

And another object of this invention is to provide new and improved methods of feeding cows during the period that the cows are in position for milking, and particularly new methods for feeding cows that are arranged in a herringbone stall layout.

And a further object is to provide improved metering apparatus for dispensing and metering feed from feed hoppers into feed boxes therefor.

In the broad concept of the invention herein disclosed, it is proposed to maintain a group of cows in milking position for a selected time period long enough to milk all the cows of the group, and to select a basic minimum feed concentrate ration for all cows to be milked, and to deliver said basic minimum feed ration to each cow by dribbling metered amounts of feed at selected time intervals into the feed box for each cow during the entire selected time period. By delivering feed to each cow coextensively with the period the cow is in milking position in its stall, the cow is kept occupied to prevent its creating a disturbance during any portion of the milking period regardless of whether the cow is a fast eater or slow eater, while at the same time the cow is fed the minimum selected feed ration.

As the next step in the broad concept herein, selected cows are fed supplemental rations at rates such that the supplemental rates together with the basic rate satisfy the feed requirements of the cow.

The invention will now be understood by reference to the drawings, wherein

FIGURE 4 is taken substantially on line 4—4 of FIGURE 3;

FIGURE 10 is a fragmentary vertical cross-section of one form of dispenser for discharging feed in selected quantities from the supply in the feed hopper means to a feed box for a cow, and FIGURE 10 is taken substantially on line 10—10 of FIGURE 11;

FIGURE 11 is a top plan view of a portion of the device of FIGURE 10 showing the feed dispenser's support plate and spinner, or feed discharger rotor, thereabove;

FIGURE 12 is an elevational view of the combination timer and switch for actuating the motor for driving the feed discharger, as shown in FIGURE 10;

Figure 1:
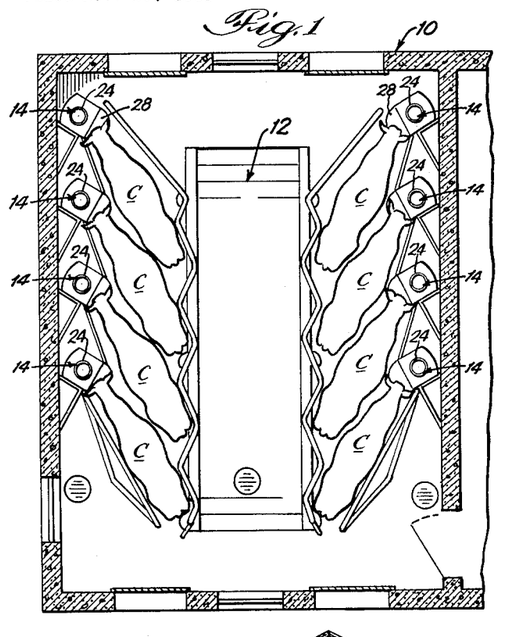
FIGURE 1 is a top plan schematic view of a herringbone type milking parlor, illustrating the individual feed boxes for the cows.
Figure 2:
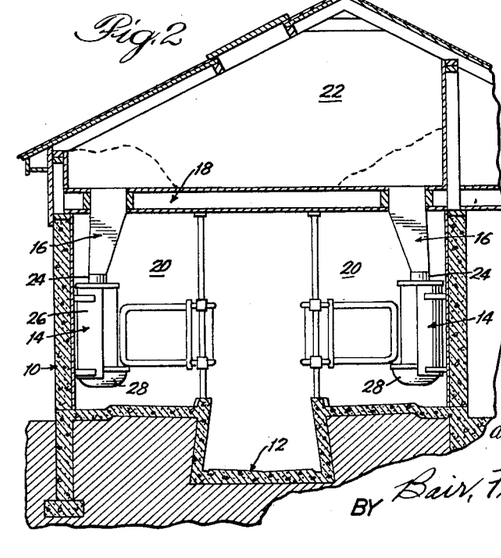
FIGURE 2 is a fragmentary elevation view of the herringbone milking parlor and illustrates the relation of a feed hopper to the individual feed boxes.

Referring now to the drawings, FIGURES 1 and 2 show a dairy building generally indicated at 10, which houses therein a herringbone-type stall arrangement for cows. As best seen in FIGURE 1, the herringbone arrangement disposes eight cows "C" in two groups of four on opposite sides of a central depressed alley 12 within which the attendant is able to move around and have access to the cows in effecting the milking of the animals. Each of the cows "C" is shown in FIGURE 1 to be feeding from a feed box means generally indicated at 14.

As illustrated in FIGURE 2, each feed box means 14 is adapted to receive feed from elongated upright hopper means, generally indicated at 16. The upper end of the hopper means 16 may open through a floor-type structure 18 which serves to divide the building 10 into a lower level 20 in which the herringbone stall system is housed and an upper level 22 within which may be stored a supply of feed concentrates for the cows. It will be understood that each hopper means 16 may be maintained filled by, from time to time, delivering feed concentrates to the upper open end of the hopper means 16, in either a manual operation or by some mechanical means, such as an auger-type feeder.

The lower end of the hopper means 16 is provided with a transition section 24 spaced closely adjacent to, and may even enter into, the feed box means 14. The feed box means 14 itself is constructed to define an upright, hollow, framed, sheet metal section 26, which receives feed from the hopper means 16, and a feed bowl portion 28 at the lower end of hollow section 26. The feed bowl 28 is open on its upper side and is laterally enlarged to permit entry of the cow's head for providing proper access to the feed carried therein. What has thus far been described generally merely sets the environment in which the inventions and improvements hereinafter disclosed are to be used.

Figure 3:
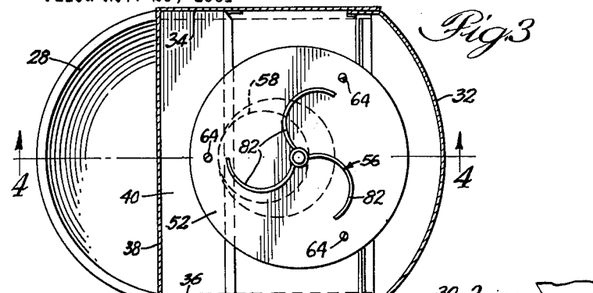
FIGURE 3 is a top plan view of the feed dispenser located between the feed hopper and feed box, and is taken substantially on line 3—3 of FIGURE 4.
Figure 4:
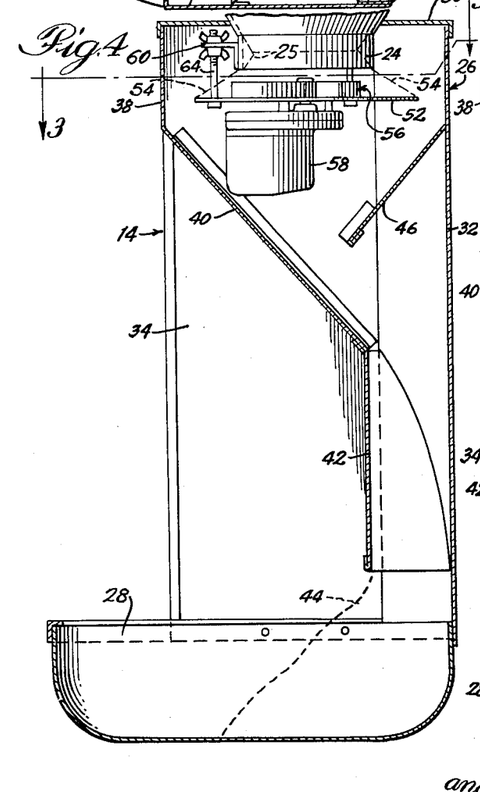
FIGURE 4 is an enlarged side elevation view with parts in cross-section of an individual feed box and showing a feed dispenser at the lower end of the feed hopper means for effecting dribble metered feeding to the feed box.
Figure 5:
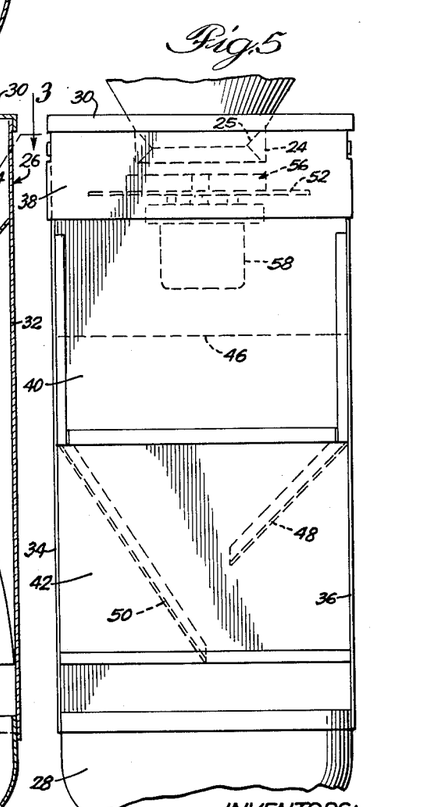
FIGURE 5 is a front elevation view of the structure of FIGURE 5 and is taken looking from the left of FIGURE 3.

Turning now to FIGURES 3 to 5, these figures show certain details of construction of the improved feed box means of this invention and also show certain details of a novel feed dispensing mechanism that is located between the transition portion 24 of the hopper means 16 and the interior of the hollow section 26 of the feed box means 14. FIGURE 4 illustrates the lower end of transition portion 24 as constituting a cylindrical, tubular part open at its lower end and to which connects a generally planar, and centrally apertured, top frame member 30 of the hollow feed section 26. The hollow section 26 of feed box means 14 also includes a vertical back panel member 32 and spaced side panel members 34 and 36 all extending between the top frame member 30 and the feed bowl 28.

The front side of the hollow section 26 of the feed box means 14 is defined by a frame member 38 that drops down a short distance from frame member 30, from whence extends a rearwardly and downwardly inclined frame member 40 which terminates a relatively short distance forwardly of rear panel 32, and from whence extends a vertical frame section 42 which is spaced in generally parallel relation forwardly of rear panel 32 to define an upright, restricted passageway through which feed drops to enter the back, or distant, end of feed bowl 28. The rearwardly inclined frame member 40 provides an entry recess through which the cow may thrust its head for access to substantially the entire area of the feed bowl 28. The manner in which feed may pile up in the feed bowl 28 is indicated by the dot-dash line 44. When pelletized feed is being used, the effective diameter of the transition portion 24 may be reduced by insertion therein of a restricting cone 25.

Within the confines of the hollow section 26 defined by the various sheet metal panels 30, 32, 34, 36, 38, 40 and 42, there are positioned a plurality of sheet metal baffles, or internal walls, which direct the feed as it falls from the feed dispenser to the feed bowl 28. As shown, in the upper portion of hollow section 26 there is a forwardly and downwardly inclined baffle 46 which connects to wall 32 and terminates at its lower end spaced from inclined baffle wall 40. In the lower portion of hollow section 26 there are a pair of inclined baffles 48 and 50 which provide a tortuous path for the feed leading to the feed bowl 28. The inclined baffles guide and slow the fall of the feed through the labyrinth-type duct means and thereby reduce the production of dust which is normally a serious source of annoyance to the cow.

The feed dispensing mechanism for selectively dispensing feed from hopper means 16 to feed box means 14 is illustrated as disposed within the upper portion of the hollow section 26 of feed box means 14, in the generally rectangular space defined by panels 32, 34, 36 and 38, and which is overlain by panel 30. The dispensing mechanism includes a circular support plate 52 which is spaced and supported below the lower terminus of the transition section 24, so that the feed discharging through transition section 24 is supported on plate 52. The dimension of circular support plate 52 is so related to the size of the discharge terminus of transition section 24 and is so related to the angle of repose of the feed concentrate that is being used, that the feed supported on the plate 52 will generally take the frusto-conical appearance as illustrated by the dot-dash line 54.

Positioned on the upper side of the support plate 52 is a rotary discharger, or spider, 56, the details of which will be best described hereinafter. Positioned below the support plate 52 is a motor 58 having a drive shaft that is coupled to the rotary discharger 56, and which motor operates for a selected period of time. The rotary movement of discharger 56, which is completely surrounded by the feed concentrate supported on the top side of support plate 52 operates to selectively discharge feed concentrate over the lateral edges of the support plate 52, and the falling feed concentrate is then directed by the inclined baffles 46, 40, 48 and 50 through the interior of hollow portion 26 of the feed box means 14, so that the feed is discharged into feed bowl 28 at the rear or inner end thereof. By depositing the feed adjacent the back wall of the bowl 28, the cow is encouraged to place its head in overlapping relation with said bowl 28, to thereby minimize loss of feed over the sides and front of the bowl 28. At the same time, the cow's attention is directed to the back wall of bowl 28 and this occupies the cow's attention, thereby inhibiting the cow from disturbing the adjacent cows.

Because of the fact that the amount of feed supported on support plate 52 is a function of the size of plate 52 related to the size of the terminus of the transition section 24 and a function of the spacing of transition section 24 above plate 52, it will be understood that the amount of feed discharged per revolution of the feed discharger 56 may be fairly accurately determined. Similarly, the amount of feed that will be discharged in any unit of time that the motor 58 is energized may also be fairly accurately determined. Now, in order to deliver selected portions of feed concentrates at uniform time intervals to a cow who is feeding at feed bowl 28, it is only necessary to energize the motor 58 at selected time intervals for selected time periods of energization. Furthermore, in order to provide a desired supplemental feed ration to the cow, it is only necessary to energize the motor 58 for a period of time which may be computed to correspond with the amount of supplemental feed to be dispensed. The means for effecting such energization of motor 58 will be discussed hereinafter in the discussion of FIGURES 12 and 13. Other means for effecting delivery of selected portions of a basic feed ration at uniform time intervals will also be disclosed, as well as other means for effecting delivery of supplemental feed rations.

Figures 6, 6A:
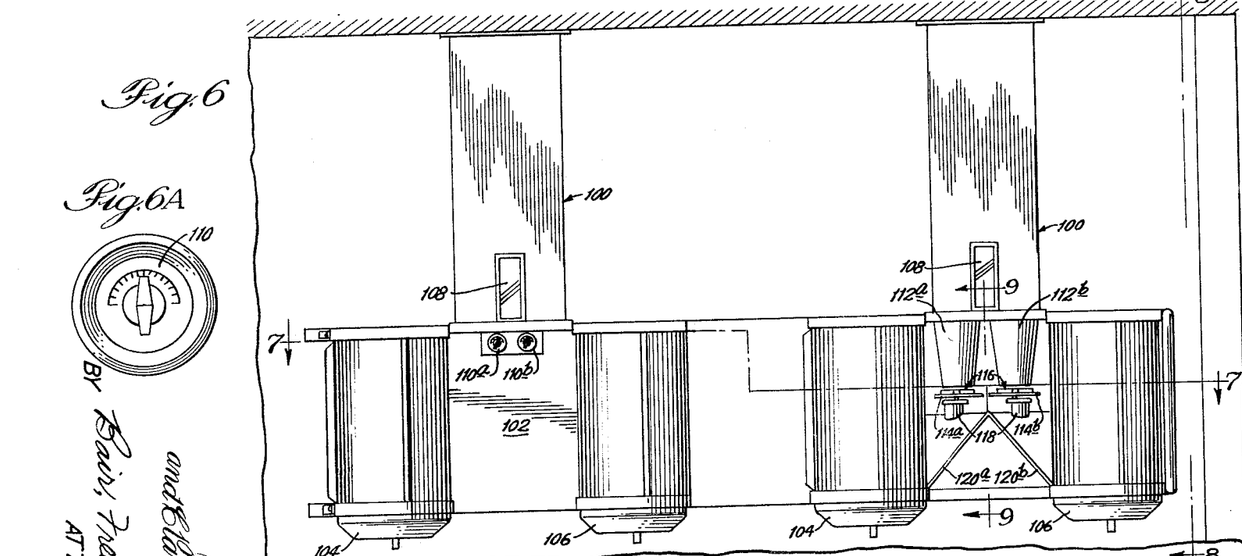
FIGURE 6 is an elevation view of a modified form of layout showing how single hoppers supply feed to a pair of dispensers for individually serving two adjacent feed boxes.
FIGURE 6A is an enlarged front elevation view of the timer control which, upon actuation thereof by turning of the control knob, initiates delivery of the supplemental feed ration.
Figure 7:
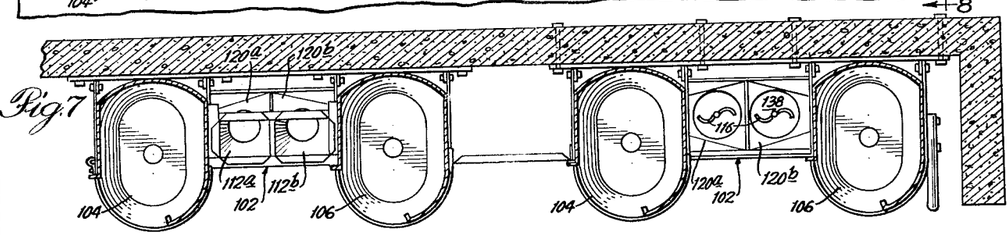
FIGURE 7 is a fragmentary cross-section view taken substantially on line 7—7 of FIGURE 6.

Turning now to a modified form of the invention as disclosed in FIGURES 6 and 7, in those figures there is disclosed an arrangement by means of which a single hopper 100 serves to deliver feed in an area located between a pair of adjacent feed bowls 104 and 106. Feed bowls may be arranged as shown in FIGURES 6 and 7 both in herringbone systems and in panel stall systems. The forward side of feed hopper 100 is provided with a transparent panel portion 108 which permits the operator to know when the amount of feed in the hopper 100 is reaching a low point, so that the hopper 100 may be refilled. The area between bowls 104 and 106 is shielded by cover means 102 which carries thereon a control panel 110 that may have separate rotatable control knobs 110a and 110b thereon, which are provided for respective control of the dispensing of feed concentrate to feed bowls 104 and 106, although it should be understood that control knobs 110a and 110b may be located in any other position, such as in or adjacent the operator's pit, convenient for remote control of the feed dispensers. On the right-hand side of FIGURE 6 the cover means 102 has been removed to expose the structure therebehind, and it will be seen that there are a pair of dispensing arrangements provided which includes separate hopper transition sections 112a and 112b, leading downwardly from hopper 100 and which terminate at their lower ends spaced above a pair of discharge support plates 114a and 114b. The feed dispensers, which include the support plates 114a and 114b, are of the same general type as herein described, and each includes a rotary dispenser 116 mounted on the upper side of the support plate and a drive motor 118 positioned below the lower side of the support plate and coupled to the dispenser 116. Appropriate inclined baffles 120a and 120b, of inverted trapezoidal shape so as to be of decreasing width along the downward extent thereof, are located below the feed dispensers for directing the feed to the respective feed pans 104 and 106. Appropriate sheet metal side walls, as shown, are joined to inclined baffles 120a and 120b along their lateral edges to confine the movement of feed to the feed bowls. The interior of transition sections 112a and 112b are generally frustro-conical as can be seen in the plan view at the left-hand side of FIGURE 7. In the disclosure of FIGURES 6 and 7 the feed is discharged laterally into the said feed bowls 104 and 106 as contrasted with the device of FIGURES 3 to 5 where the feed is dispensed into the back end of feed bowl 28.

Figures 8, 9:
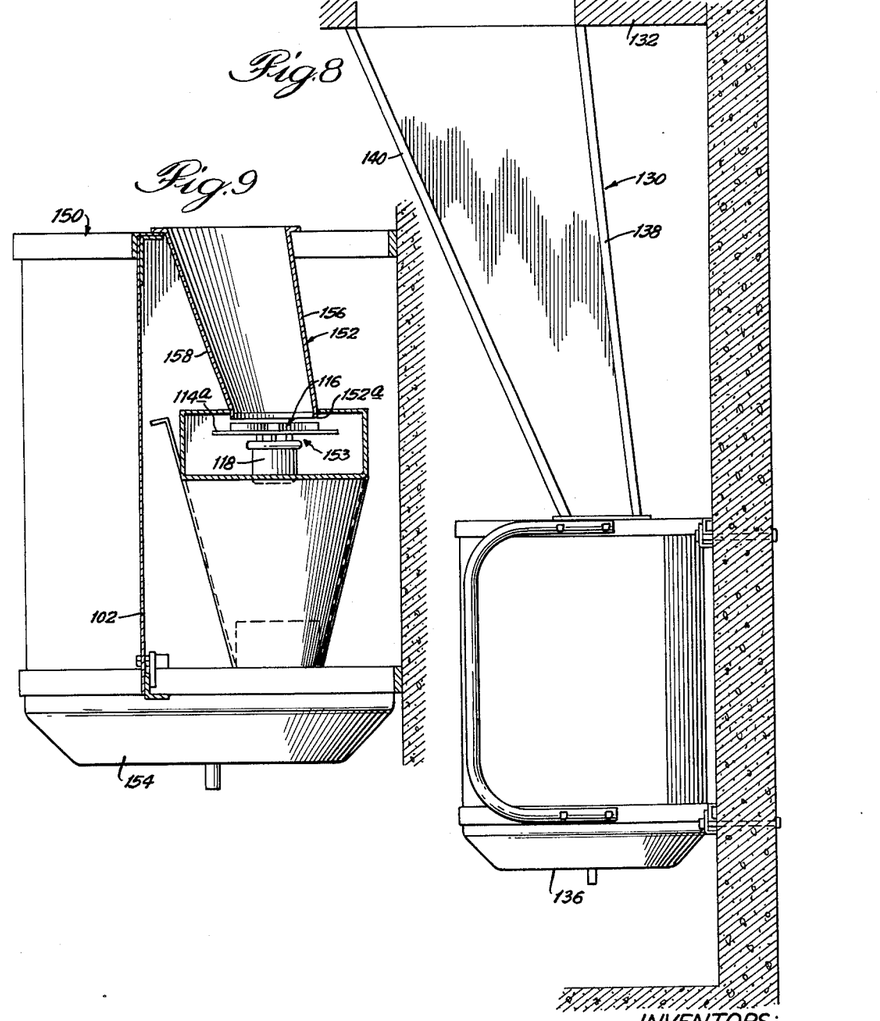
FIGURE 8 is an enlarged side elevation view taken substantially on line 8—8 of FIGURE 6.
FIGURE 9 is a cross-section view of one of the feed dispenser arrangements shown in FIGURE 6, and is taken on line 9—9 of FIGURE 6.

In a preferred form of hopper means as illustrated generally in FIGURE 2, and as shown in detail in FIGURES 8 and 9, the hopper means is generally indicated at 130 and is shown extending downwardly from a horizontal, floor-type structure 132 to the upper end of a feed box means generally indicated at 134. In FIGURE 8 the feed bowl is 136. An improvement in the hopper means 130 is found in the arrangement of the slope of opposite interior surfaces of the hopper walls. In FIGURE 8, the hopper 130 is of quadrilateral cross-section. As shown, two opposite sides of the hopper are defined by downwardly converging walls 138 and 140, where both walls incline in the same general direction away from vertical. The one wall 138 inclines at about five degrees (5°) from vertical and the other wall 140 inclines at about thirty degrees (30°) from vertical, so that as the walls project downwardly they also converge. The other two walls of the hopper which complete the quadrilateral cross-section may be parallel to each other, but preferably the same inclined relationship exists between them as with respect to walls 138 and 140. These inclinations in the walls of the hopper operate to prevent bridging over of the feed in the hopper means 130 as the feed moves downwardly by gravity to the feed dispenser mechanism within the feed box means 134.

In a modified construction shown in FIGURE 9, the feed box means is generally indicated at 150, and within the feed box means there is a hopper section 152 which leads downwardly to a cylindrical tubular throat section 152a spaced above a feed dispenser 153 for dispensing feed into a feed bowl 154. The hopper section 152 is in the shape of an inverted frustrum of a cone where the surface of the cone is generated by the rotation of an element that is at all positions inclined to one side of a vertical plane. The frusto-conical hopper section 152 thus defines in an axial plane thereof, as shown, a pair of opposed surfaces or elements 156 and 158 which incline in the same direction away from the said vertical plane, with element 156 sloping at about five degrees (5°) from the vertical and with element 158 sloping at about thirty degrees (30°) from the vertical. Again, these different inclinations of opposed surfaces, or elements, of the downwardly converging hopper 152 prevents bridging over of feed within the hopper section.

Figures 10, 11, 12:
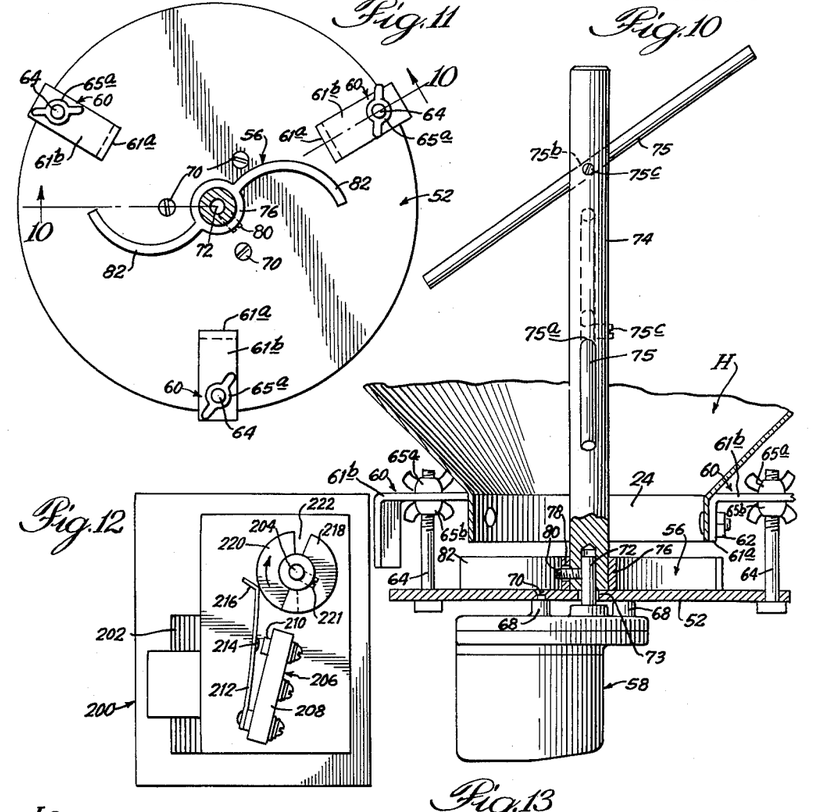

In FIGURES 10 and 11 there is illustrated one form of a feed dispenser that is positioned between the lower end of a feed hopper means and the interior of the hollow feed-box means through which the dispensed feed is to be channeled for delivery to the feed bowl. In FIGURE 10, a fragment of the lower end of a feed hopper means is generally indicated at "H", the lower end of which defines a tubular transition section, or throat, 24 which, in actual practice, is about one inch in axial length. Connected to the throat 24, in equal circumferentially spaced manner, are three radially elongated leveling brackets generally indicated at 60. Each leveling bracket 60 is shaped to define a vertical leg 61a, that conects directly to the throat 24 by screw and bolt means 62, and a horizontal leg 61b that extends radially outwardly of throat 24 and which is apertured to receive vertically therethrough a threaded stud 64 which connects to and helps suspend the support plate 52 therefrom. Each threaded stud 64 is provided with an upper wing nut 65a and a lower wing nut 65b, whose cooperation with the horizontal leg 61b of bracket 60 permits of adjustment in the leveling of support plate 52, and in the spacing of plate 52 from the lower terminus of hopper transition section 24.

The combination motor and gear reducer 58 that is disposed below the support plate 52 provides thereon a plurality of tapped attachment bosses 68 which engage the underside of plate 52 and which are adapted to receive therein connector screws 70 which are countersunk flush with the upper surface of plate 52. The motor 58 provides an upwardly extending output shaft 72 from the gear reducer, and said output shaft projects through a central aperture 73 in plate 52 to extend above plate 52. The speed of the output shaft is about 6 r.p.m.

There is provided an agitator shaft 74, having a tubular lower end which slidably fits onto drive shaft 72. The elongated agitator shaft 74 extends upwardly coaxially of hopper means "H" and carries thereon, for action within hopper "H", a plurality of elongated agitator arms 75 which extend transversely of shaft 74, and which are preferably arranged inclined to the axis of shaft 74. The four agitator arms 75 are defined by two (2) elongated rods of polyethylene, thereby providing for some flexibility in the arms, which extend through inclined bores 75a and 75b in shaft 74. The polyethylene rods are maintained in position by set screws 75c.

Surrounding the lower end of shaft 74 is a hub element 76 having an enlarged aperture 78 therein. A set screw 80, carried by agitator shaft 74, clampingly engages the drive shaft 72 at one end. The other end of set screw 80 projects radially outwardly through aperture 78, thereby coupling the hub 76 to the drive shaft 72 for rotation therewith.

The feed pusher 56 includes the hub 76 and a plurality of arcuate arms, or vanes, 82 which are secured to hub 76, and which project outwardly of hub 76 in a direction generally radially of the support plate 52 and of the drive shaft 72. The height of the arms 82 is such, as shown in FIGURE 10, that said arms 82 are disposed in the space between the lower terminus of transition section 24 and the upper side of plate 52. The outward projection of arms 82 is at least as great as the size of the discharge opening in transition section 24 and, preferably, as seen in FIGURE 10, the arms 82 extend radially outwardly beyond the downward projection of transition section 24. Where pelletized feed is to be used, and because of the smaller angle of repose, a constrictor 25a may be inserted into hopper H, and preferably in section 24, to reduce the size of the discharge opening.

FIGURE 12 shows a combination timer and switch, generally indicated at 200, which includes a timer motor 202 of typical construction which operates to drive a shaft 204 that is arranged to actuate a switch generally indicated at 206 through a cam means. The switch 206 includes a terminal block 208 that carries a stationary contact 210, and an elongated flexible contactor blade 212 upon which is mounted a movable contact 214 which is adapted for movement toward and away from said stationary contact 210. The extended end of blade 212 is shaped to define a cam rider 216 which is wide enough to engage the cam periphery of each of a pair of semi-circular cam plates 218 and 220 that are carried on and rotate with shaft 204. At least one of the cam plates, for example plate 218, is selectively adjustable on shaft 204, by means of set screw 221 carried by a hub attached to said cam plate, for the purpose of providing and varying a gap 222 defined between the cam plates 218 and 220.

It will be understood from the foregoing that, as shaft 204 rotates at a preselected rate, and as long as the cam rider 216 is in engagement with the surface of either of the cams 218 or 220, the switch contacts 210 and 214 are spaced apart and no circuit is effected therethrough. When the gap 222 moves into register with cam rider 216, the switch contacts 210 and 214 close temporarily, until further rotation of shaft 204 effects reengagement of one of the cams with cam rider 216, which again opens the switch.

Figure 13:
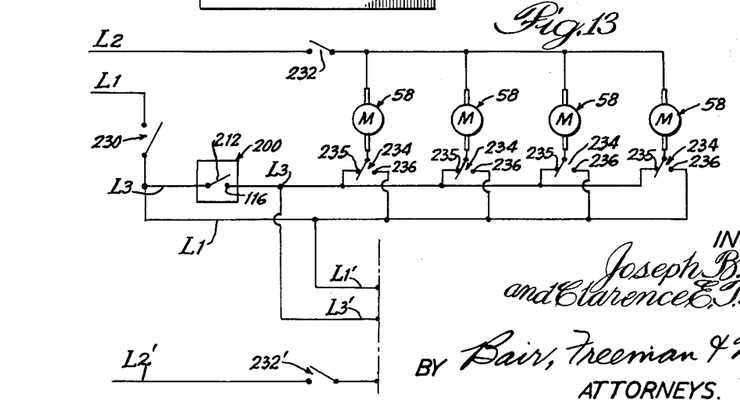
FIGURE 13 is a typical wiring diagram showing the electrical connections for four feed dispensers of the type shown in FIGURES 10 to 12.

The combination timer and switch described in FIGURE 12 is part of an energizing circuit that is illustrated in FIGURE 13. FIGURE 13 shows a plurality of motors 58 disposed in parallel, and it will be understood that each motor is arranged to actuate a separate feed pusher 56 of a feed dispenser. FIGURE 13 correlates with FIGURE 13 by providing a motor 58 for each of the feed boxes 14 on one side of the herringbone stall arrangement. It will be understood that any number of motors 58 may be connected in parallel, and a duplicate arrangement may be provided for the other side of the herringbone stall arrangement. Referring back to FIGURE 13, it will be seen that the motors 58 connect at one side to electrical lead L2. The other electrical lead, of a standard 115 v. supply, is indicated at L1. A line L3 is arranged in parallel to lead L1. A master control switch 230 is provided for on-and-off control of the entire wiring arrangement. Conveniently the switch 230 may be provided at one end of the alley 12 so that the entire system may be selectively controlled to "on" or "off" by the milking stall operator.

The combination motor and timer switch 200 is shown disposed in line L3. Parallel connections beyond switches 230 and 200 are shown to lines L1' and L3' for energizing a plurality of motors for dispensing feed to cows on the other side of the alley 12 in the herringbone stall arrangement of FIGURE 1. The master manual switch 230 and the motor timer switch 200 thus control both sides of the herringbone layout. Each lead L2 and L2' is provided with a switch 232 for individual control of only one side of the herringbone layout.

To complete the basic control system, a timer-operated control switch 234 is provided in series with each motor 58. Each control switch 234 has two contacts 235 and 236. The contact 236 connects to lead L1 and the contact 235 connects to line L3. The switch 234 is of the type that is normally biased to the position shown in FIGURE 13, with circuit established through contact 235. Switch 234 may be manually moved to its alternate position, and in said alternate position circuit is made through contact 236. The manual action (a rotation of a knob) which moves switch 234 to establish circuit through contact 236 also operates to mechanically set a timer in operation with the amount of time set on the timer being a selective function of the amount of rotation of the control knob. Timer-switches of this type are well known in the trade. In operation, while the timer is timing out the preselected period, circuit is maintained through contact 236. As soon as the time period is timed out, the switch moves to effect circuit through contact 235.

With the foregoing in mind, it will be readily understood that when the master manual switch 230 is closed after all the cows are properly positioned in their stalls, and assuming that switch 232 is closed, the combination motor and switch 200 begins cyclical operation to effect cyclical energization of each motor 58 whenever contacts 210 and 214 are engaged. Since the motor 202 is constantly effecting rotation of shaft 204, the cyclical energization of motors 58 is for only a sub-interval of the time it takes for shaft 204 to make a complete revolution. During the interval that motor 58 is energized, the feed pusher 56 is rotated a preselected amount and effects lateral discharge of feed over the free edge of support plate 52. By adjusting the size of gap 222, and dependent upon the rate of rotation of shaft 204, discrete amounts of feed will be dribbled from the feed dispenser at regular time intervals to the feed bowl. The total of said dribbled feed can be set for a preselected poundage depending upon the period in which the cows are to be in their stalls.

Now, if the attendant wishes to deliver a supplemental feed ration to any preselected cow, the attendant operates the timer switch 234 to effect a circuit through contact 236. With a circuit through contact 236, the motor 58 is constantly energized between leads L1 and L2 and, since the switch 234 is a timer-operated one, the selection of a particular length of time for dispensing may be accurately correlated with the rate of feed dispensing by feed pusher 56, and the attendant thereby controls or sets substantially the precise weight of supplemental feed to be delivered to selected cows. After the supplemental feed has been delivered by the timers of selected switches 234 timing out, each switch 234 will have been returned to engagement with contact 235 and the normal dribble feed operation continues during the remainder of the time that the cows are in the milking stalls.

In a specific system utilizing the foregoing principles, the combination timer and switch is selected so that shaft 204 makes one revolution in 15 seconds. Thus, the dribble of a discrete amount of feed will occur every 15 seconds. Considering a milking period to extend for 10 minutes, the dribble feeders should normally deliver about 2 pounds of feed concentrate in the 10-minute period. By varying the size of gap 222, the size of the basic feed ration delivered by dribbling may be increased. The master switch 230 may be conveniently located at one end of the attendant's alley 12 and is a simple push button type on-off switch. With the entry gate open to the herringbone stall and with the cows just entering, the attendant closes switch 230 and the dribbling of feed commences to each feed bowl. The little bit of feed from the first dribble encourages the cows to move promptly into position in the herringbone, and entry time is about 10 to 15 seconds. After the cows are positioned and the entry gate closed, the attendant proceeds to do the necessary steps of cleaning the cow udders and applying the milking machines. The dribbling of feed keeps the cows occupied and contented during the make-ready period, during the milk-letting period, and during the period when the teat cups are removed. Being contented helps slow-milking cows to let their milk more rapidly.

In the inspection of each cow the attendant notes which cows should receive a supplemental feed ration, and at that time the attendant, if necessary, sets the appropriate timed switch 234 to a proper setting for delivering a selected additional feed ration to a particular cow. About 25% of a normal herd will have its total feed needs satisfied by the basic ration delivered by the dribble feed alone. The period of time of operation of switch 234 is less than the total milking period and when the switch 234 times out, then the normal dribble feed continues for the remainder of the milking period. In practice, a system as hereinabove described has been able to deliver between 2 to 20 lbs. of feed total per cow. Just before the cows leave the stall, the switch 230 is opened and the cows finish the small amount of feed remaining in their bowls. Then, when the exit gate is opened. the cows have no further interest in the feed bowls and they will leave the stall promply and eliminate loitering. Furthermore, since all the bowls will be emptied, the cows will not try to get additional feed from the bowls that they pass as they file out.

While the system disclosed uses electrically operated means for effecting both dribble feed and delivery of supplemental feed, it will be understood that the delivery of the supplemental feed, particularly, lends itself to other actuating systems. For example, a cable pull, with a spring return of the cable, could be provided for effecting supplemental rotation of the feed pusher 56, and the cable could be graduated in segments of length to provide a measure of the amount of feed being supplied supplementally. Furthermore, the number of dribbles per minute may be varied from four per minute to more or less per minute, although the dribbles preferably should be every 15 seconds to every 20 seconds maximum. It has been observed that dribbling feed at 30 seconds intervals causes milk delivery to fall off. And the number of arms on the feed pusher 56 may also be varied from 2 to 3, 4, or more.

Figures 14, 15, 16, 17, 18:
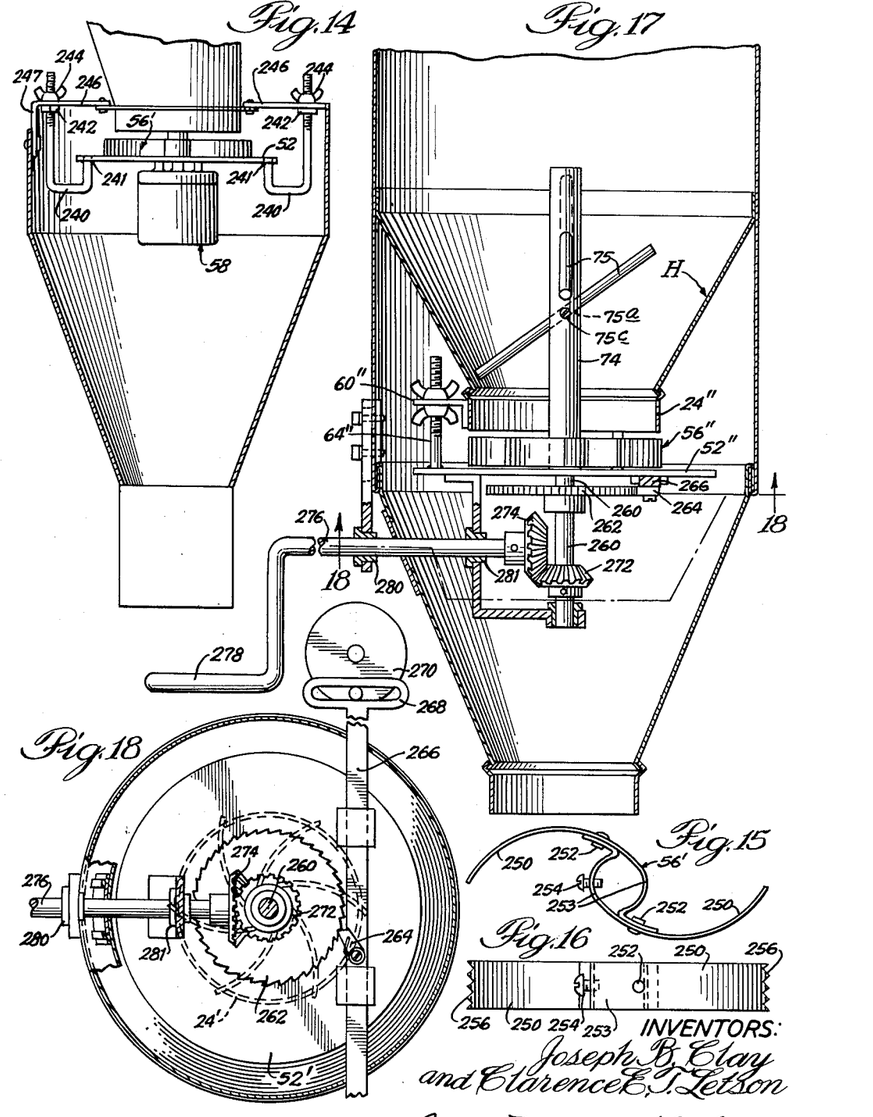
FIGURE 14 is a fragmentary elevational cross-section view showing a modified form of feed dispenser.
FIGURE 15 is a plan view of the feed discharger utilized in FIGURE 14.
FIGURE 16 is an enlarged side elevation view of the feed discharger shown in FIGURE 15.
FIGURE 17 is an enlarged fragmentary vertical cross-section view showing still another modified form of feed dispenser and illustrating a variation in the form of drive for effecting dribbled feed and a variation in the means for supplying a supplemental feed ration.
FIGURE 18 is a cross-section view taken substantially on line 18—18 of FIGURE 17.

Turning now to the remaining modifications disclosed herein, FIGURES 14 to 16 illustrate certain modifications and improvements over the feed dispensing means shown in FIGURES 10 and 11. In FIGURE 14, the support plate 52 is supported by three members 240 that are formed into a J-shape, with the short leg of each J engaging and entering a recess 241 in the underside of the plate 52, and the long leg of each J spaced radially outwardly of the free edge of the plate 52 and extending upwardly above plate 52 to provide a threaded shank for carrying spaced adjustment nuts 242 and 244 for cooperation with a support bracket 246 which connect to the hopper means H'. Each support element 246 has a radially outwardly located and downwardly extending leg 247, to which may be connected frame members that serve to partially define the hollow feed box means 14' through which the dispensed feed is directed for discharge into a feed bowl.

An improved feed pusher 56', shown in FIGURES 14 to 16, includes a pair of similar, arcuate sheet metal blades 250 which are secured together by rivets 252 to define a central, annular hub 253 which carries a screw 254 adapted for connection to the agitator shaft or to the drive shaft a motor 58. The outermost edges of the spring steel blades 250 are notched or serrated at 256 to provide a rake-like effect that will operate to maintain the upper surface of the support plate 52 clear of obstructions and accumulations.

The arrangement shown in FIGURES 14 to 16 has advantages over that shown in FIGURES 10 and 11 in that the support elements for the plate 52 are spaced radially outwardly of the free edge of the support plate 52, thereby preventing accumulations of feed on such support elements, and preventing build-up of accumulations which could be engaged by the arms of a rotating feed pusher 56. Furthermore, even in the event there are accumulations on plate 52, the freezing or stalling of the motor 58 is avoided by making the arms 250 of resilient, flexible spring steel, thereby permitting flexing of the arms 250 to pass an obstruction, rather than to effect stall of the motor. The serrated ends 256 further cooperate to maintain the upper surface of support plate 52 clear of obstructions and accumulations of feed.

FIGURES 17 and 18 illustrate a modified form of dispenser construction and means for actuation thereof. In FIGURE 17, the feed hopper is indicated at H and it is provided with a cylindrical transition section 24". A feed support plate 52" is spaced below the transition section 24" and is supported by threaded studs 64" which, in turn, are supported from support brackets 69". A feed pusher 56" is positioned on the upper side of plate 52", between plate 52" and transition section 24". The feed pusher 56" is driven at repeated intervals through means of an upright shaft 260 that extends below plate 52" and which carries thereon a ratchet wheel 262. The ratchet wheel 262 may be driven by a pivotally mounted and spring biased dog 264 that is connected to an elongated bar 266, which connects to a reciprocating driver 268 that is actuated by a rotary motor 270. Alternative to the dog and ratchet connection, there could be provided a rack and one-way pinion drive. The shaft 260 extends below ratchet wheel 262 and carries thereon a bevel gear 272 adapted to be driven by another bevel gear 274 carried at one end of an elongated crank shaft 276 which is provided with a crank handle 278. The crank shaft 276 is slidably carried in bearings 280 and 281.

In the operation of the device of FIGURES 17 and 18, the rotary movement of motor 270 causes reciprocating action of bar 266, and the dog and ratchet arrangement provides for stepped rotation of the feed pusher 56" to thereby effect dribbling of feed over the free edge of the support plate 52" at a preselected rate. The crank shaft 276 is normally retracted outwardly so that the gears 272 and 274 are out of mesh. However, when an operator wishes to deliver supplemental feed to a cow, the shaft 276 is thrust forward to engage bevel gear 272 with bevel gear 274 and, by manual rotation of the crank 278, the feed pusher 56" may be manually actuated to effect delivery of a selected supplemental amount of feed to selected cows.

Figures 19, 20, 21, 22:
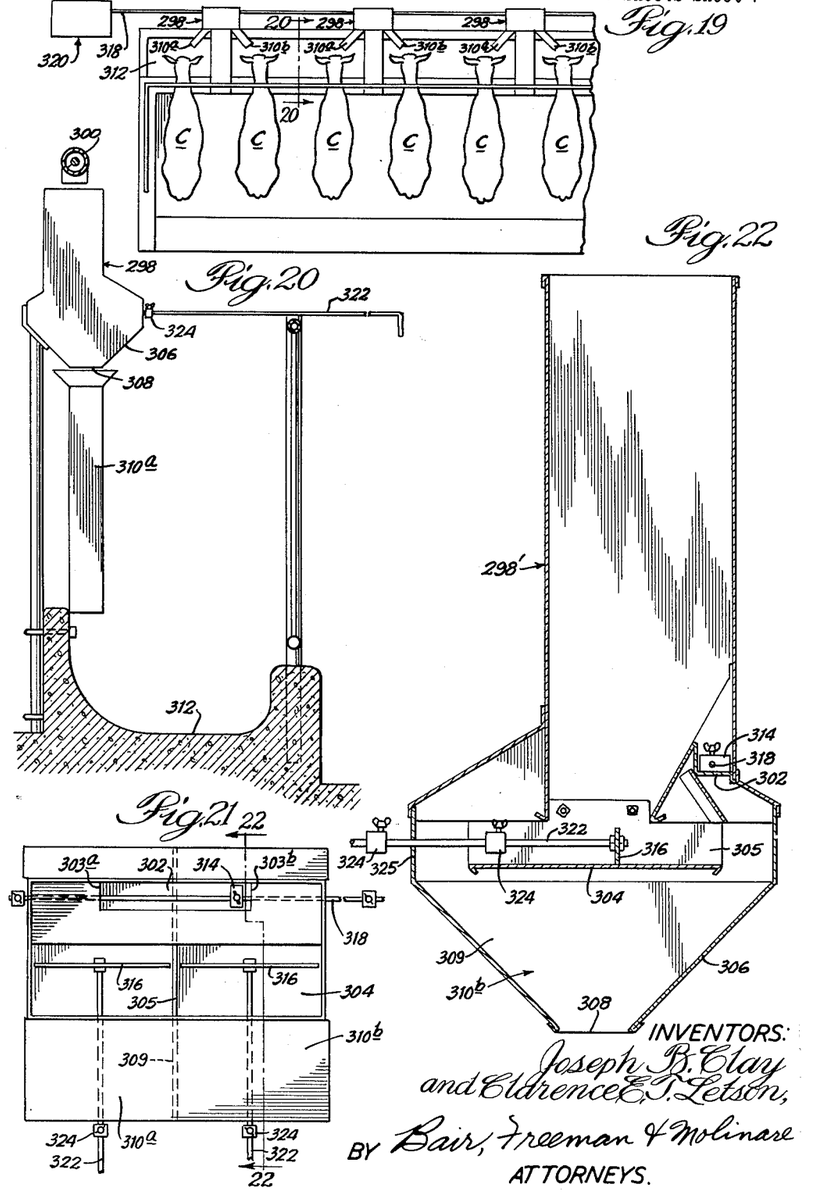
FIGURE 19 is a top plan view showing a typical panel stall arrangement for feeding of cows, and illustrating the arrangement of feed dispensers for providing dribbled feed for cows in a panel stall.
FIGURE 20 is an enlarged fragmentary side elevation view of the feed portion of the panel stall layout shown in FIGURE 19.
FIGURE 21 is an enlarged top plan view looking downwardly into the interior of the hopper means shown in FIGURE 20.
FIGURE 22 is an enlarged cross-section view taken substantially on line 22—22 of FIGURE 21.

Still another modification, which delivers both a predetermined quantity of feed in a dribble feed operation and a selected amount of supplemental feed by a separate operation, is shown in the device shown in FIGURES 19 to 21. In FIGURE 19, the cows C' are illustrated in a typical panel stall arrangement. The feed may be delivered to the hoppers 298 by means of an auger conveyor 300. The interior of the hopper 298 is so chambered as to direct feed onto both a first horizontal support plate 302 and a second horizontal support plate 304. The feed that is pushed off the free edges 303a and 303b of the support plate 302 discharges into different portions of hopper 298 and is directed by interior framing 309 of hopper 298 into respective discharge ducts 310a and 130b. Similarly, the support plate 304 is divided by partition 305 to provide separate feeders for the respective ducts 310a and 310b. The discharged feed passes downwardly through hollow frame means 306 for discharge through bottom openings 308 into ducts 310 for delivery to feed trough, or basin, 312. A feed pusher 314, in the form of an upright plate, is mounted for sliding movement across the top of support plate 302. A pair of second pushers, each in the form of an upright plate 316, is mounted for sliding movement across the top of support plate 304. The feed pusher 314 is rigidly secured to an elongated actuator bar 318 which connects to a drive means generally indicated at 320 which may, for example, be of the type shown in FIGURE 18. In any event, the reciprocation of actuator bar 318 effects movement of the feed pusher 314 so as to discharge feed off each of the free ends of support plate 302, whereupon the feed will pass through apertures 308 and through ducts 310a and 310b into feed troughs 312. Since the rate of reciprocation of bar 318 may be controlled, feed is dribbled at a preselected rate to each cow. Each supplemental pusher plate 316 is provided with an individaul control rod 322, so that the attendant may actuate each rod 322 independently to discharge supplemental feed rations off the free edges of support plate 304 so as to deliver supplemental feed rations to selected cows. The discharge is effected by merely pushing and pulling on the rod 322 to reciprocate the same, and the range of thrust of the rod 322 may be controlled by selectively adjustable stop members 324 carried on rod 322 and positioned on opposite sides of a wall 325 of the hopper means.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new, and desire to secure by Letters Patent of the United States, is:

1. A cow feeding system for use with a cow-milking system wherein a plurality of cows are disposed in closely adjacent relationship and are milked substantially simultaneously during a pre-selected milking period; said cow feeding system comprising, in combination, means providing a separate feed box for each cow; and dispensing means operatively associated with each feed box for dispensing a predetermined basic feed ration to each feed box during the entire milking period in sub-portion of the feed ration and timed actuator means operatively associated with said dispensing means for automatically actuating said dispensing means at sub-intervals of the milking period.

2. A cow feeding system for use with a cow-milking system wherein a plurality of cows are disposed in closely adjacent relationship and are milked substantially simultaneously during a pre-selected milking period; said cow feeding system comprising, in combination, means providing a separate feed box for each cow; dispensing means operatively associated with each feed box for dispensing a predetermined basic feed ration to each feed box during the entire milking period in sub-portions of the feed ration and timed actuator means operatively associated with said dispensing means for automatically actuating said dispensing means at sub-intervals of the milking period; and means operatively associated with each dispensing means for delivering a supplemental feed ration to selected feed boxes.

3. A cow feeding system for use with a cow-milking system wherein a plurality of cows are disposed in closely adjacent relationship and are milked substantially simultaneously during a pre-selected milking period; said feeding system comprising, in combination, means providing a separate feed box for each cow; a separate feed dispenser for each said feed box; and dispensing means operatively associated with each feed dispenser for delivering a predetermined basic feed ration from each feed dispenser to each feed box in discrete sub-portions of said basic feed ration, and timed actuator means operatively associated with said dispensing means for automatically actuating said dispensing means at sub-intervals of the milking period.

4. A cow feeding system for use with a cow-milking system wherein a plurality of cows are disposed in closely adjacent relationship and are milked substantially simultaneously during a pre-selected milking period; said feeding system comprising, in combination, means providing a separate feed box for each cow; a separate feed dispenser for each said feed box; dispensing means operatively associated with each feed dispenser for delivering a predetermined basic feed ration from each feed dispenser to each feed box in discrete sub-portions of said basic feed ration, and timed actuator means operatively associated with said dispensing means for automatically actuating said dispensing means at sub-intervals of the milking period; and means operatively associated with each dribble means for delivering a supplemental feed ration to selected feed boxes from the feed dispensers for said selected feed boxes.

5. In the simultaneous feeding and milking of a plurality of cows disposed in closely adjacent relationship in milking stalls, the improved method of feeding that includes the step of delivering a basic feed ration to each cow by automatically dispensing the feed ration to the cow in discrete, substantially equal, quantities delivered at substantially equal time intervals during the entire time period in which the plurality of cows are in their milking stalls.

6. In the simultaneous feeding and milking of a plurality of cows disposed in closely adjacent relationship in milking stalls, the improved method of feeding that includes the steps of delivering a basic feed ration to each cow by automatically dispensing the feed ration to the cow in discrete, substantially equal, quantities delivered at substantially equal time intervals during the entire time period in which the plurality of cows are in their milking stalls, and dispensing selected supplemental feed rations to selected cows after the milking period has begun.

7. The method of simultaneously feeding and milking a plurality of cows comprising the steps of: arranging the plurality of cows in milking position and maintaining said cows in said milking position for a pre-selected feeding period which is long enough in time for the slowest cow to let substantially all of its milk, and delivering a selected basic feed ration to each cow by automatically dispensing the selected feed ration to the cow in discrete, substantially equal, quantities delivered at substantially equal time intervals during the entire pre-selected feeding period.

8. The method of simultaneously feeding and milking a plurality of cows comprising the steps of: arranging the plurality of cows in milking position and maintaining said cows in said milking position for a pre-selected feeding period which is long enough in time for the slowest cow to let substantially all of its milk, delivering a selected basic feed ration to each cow by automatically dispensing the selected feed ration to the cow in discrete, substantially equal, quantities delivered at substantially equal time intervals during the entire pre-selected milking period, and dispensing supplemental feed rations in selected amounts to selected cows during a portion of said pre-selected period.

9. A cow feeding system for use with a cow-milking system wherein a plurality of cows are disposed in closely adjacent relationship and are milked substantially simultaneously during a pre-selected milking period; said cow feeding system comprising, in combination, means providing a separate feed box for each cow; and means for dispensing a predetermined basic feed ration to each feed box during the entire milking period, timed actuator means operatively associated with said dispensing means for automatically actuating said dispensing means at sub-intervals of the milking period, said dispensing means comprising a stationary feed support plate having an exposed edge over which feed that rests on said support plate may be moved, feed hopper means with a bottom opening therein of smaller size than said support plate and spaced closely above said support plate, so that feed emanating from said bottom opening will rest on said support plate at the angle of repose of said feed, and a movable feed pusher on the upper side of said support plate for selectively discharging feed laterally of said support plate over said exposed edge of the support plate.

10. A feeding system for feeding a plurality of domestic farm animals at the same time during a selected feeding period, where the animals are located in closely adjacent relation where they could annoy other of the animals during the feeding period; said feeding system compring, in combination: means defining separate feed boxes each of a size adapted to accommodate the head of only one animal during normal feeding, each feed box having feed dispensing means operatively associated therewith, the feed dispensing means being arranged to deliver a predetermined basic feed ration to the feed box during the entire feeding period in sub-portions of the feed ration, and timed actuator means operatively associated with said dispensing means for automatically actuating said dispensing means at sub-intervals of the feeding period, so as to occupy the feeding animal's attention with feeding during the entire feeding period regardless of the normal rate of eating by any individual animal and to thereby inhibit the animal from annoying other animals during the said feeding period, and actuator means operatively associated with said feed dispensing means at subintervals of the feeding period.

11. An improved method of feeding basic feed rations to a plurality of domestic farm animals that are disposed in closely adjacent relationship, said method comprising the steps of selecting the length of a feeding period during which the animals are to be fed, and then automatically dispensing a basic feed ration to each animal in discrete, substantially equal quantities delivered at substantially equal time intervals during the entire said feeding period, so as to occupy each animal's attention with feeding during the entire said feeding period, regardless of the normal rate of eating of any individual animal, and thereby inhibiting conflict and annoyance among the feeding animals during the said feeding period.

12. A device as set forth in claim 9 wherein said support plate is circular, the movable feed pusher being a rotatable member separate from said support plate, and a motor below said support plate for rotating the feed pusher.

13. A device as set forth in claim 9 wherein said movable feed pusher is a rotatable member that is separate from said support plate, a motor for rotating said feed pusher, and repetitive timing means cooperating with said motor for effecting rotation of the feed pusher at repeated selected time intervals.

14. A device as set forth in claim 13 including a second timing means for effecting selected rotation of the feed pusher over a selected, extended, time period.

15. A device as set forth in claim 9 wherein said feed pusher is a rotatable member and including a feed agitator that is rotatable with said feed pusher and which extends upwardly into said feed hopper means, said feed agitator including an elongated stem extending axially of said feed pusher, and elongated flexible elements carried by said stem and extending transversely of said stem at an incline to the axis of said stem.

16. A device as set forth in claim 9 wherein said feed pusher is a rotatable member that includes a plurality of arcuate arms that project outwardly and generally radially of the axis of the feed pusher, and said arcuate arms being relatively flexible to permit their passing obstructions.

17. A device as set forth in claim 16 wherein the extended ends of the arms of the feed pusher are serrated to assist in maintaining the upper side of the support plate unobstructed.

18. A device as set forth in claim 9 wherein said feed pusher is automatically actuated, and including a second manually actuatable feed pusher for selectively effecting discharge of feed from said support plate independently of the dispensing of feed by the first mentioned feed pusher.

19. A device as set forth in claim 9 including feed conduit means between each said feed dispensing means and its associate feed box through which the dispensed feed passes to be directed into the feed box, and inclined baffles in the conduit means for slowing the movement of the dispensed feed as it passes therethrough, so as to inhibit generation of dust from feed discharging into the feed box.

References Cited in the file of this patent
UNITED STATES PATENTS

| | | |
|---|---|---|
| 1,392,311 | Egeland | Oct. 4, 1921 |
| 1,533,796 | Genuit | Apr. 14, 1925 |
| 1,649,250 | Patterson | Nov. 15, 1927 |
| 2,189,213 | MacDonell | Feb. 6, 1940 |
| 2,661,122 | Peterson | Dec. 1, 1953 |
| 2,858,800 | Babson | Nov. 4, 1958 |
| 2,886,000 | Clegg | May 12, 1959 |
| 2,969,039 | Golay | Jan. 24, 1961 |
| 3,034,688 | Rudd | May 15, 1962 |

FOREIGN PATENTS

| | | |
|---|---|---|
| 831,468 | Germany | Feb. 14, 1952 |
| 812,017 | Great Britain | Apr. 15, 1959 |